United States Patent
Mula et al.

(10) Patent No.: US 12,354,386 B1
(45) Date of Patent: Jul. 8, 2025

(54) BARMASTER AUTOMATED ORDER SYSTEM USING SCALE AND BIOMETRICS

(71) Applicants: Paul S Mula, San Jose, CA (US); Scott C Harris, Rancho Santa Fe, CA (US)

(72) Inventors: Paul S Mula, San Jose, CA (US); Scott C Harris, Rancho Santa Fe, CA (US)

( * ) Notice: Subject to any disclaimer, the term of this patent is extended or adjusted under 35 U.S.C. 154(b) by 0 days.

(21) Appl. No.: 18/631,897

(22) Filed: Apr. 10, 2024

(51) Int. Cl.
   G06V 40/10    (2022.01)
   G01G 19/00    (2006.01)
   G06V 20/68    (2022.01)

(52) U.S. Cl.
   CPC .............. *G06V 20/68* (2022.01); *G01G 19/00* (2013.01); *G06V 40/11* (2022.01)

(58) Field of Classification Search
   CPC ........ G01G 19/40; G01G 19/52; G01G 19/14; G01G 19/4144; G01G 23/18; G01G 19/414; G01G 23/3735; G01G 17/00; G01G 19/00; G01G 21/28; G01G 23/36; G01G 23/37; G06T 7/97; G06T 2207/10016; G06T 2207/10021; G06T 2207/10024; G06T 2207/30242; G06T 7/0002; G06T 7/50; G06T 7/70; G06T 7/73; G06T 7/80; G06T 2207/10004; G06T 2207/30108; G06T 2207/00; G06T 7/0012; G06T 7/44; G06T 7/00; G06V 20/68; G06V 40/11; G06V 40/117
   See application file for complete search history.

(56) References Cited

U.S. PATENT DOCUMENTS

| | | | |
|---|---|---|---|
| 2,503,259 | A | 4/1950 | Hall |
| 2,512,050 | A | 6/1950 | Ash |
| 4,961,533 | A | 10/1990 | Teller |
| 5,603,430 | A | 2/1997 | Loehrke |
| 5,837,944 | A | 11/1998 | Herot |
| 6,450,406 | B2 | 9/2002 | Brown |

(Continued)

FOREIGN PATENT DOCUMENTS

| | | | | |
|---|---|---|---|---|
| AU | 2014269972 B2 | | 1/2016 | |
| CN | 102084401 B | * | 10/2013 | ....... G06Q 20/40145 |

(Continued)

OTHER PUBLICATIONS

U.S. Appl. No. 10/121,121, filed Nov. 6, 2018, Jeremy Samuel De Bonet.

(Continued)

*Primary Examiner* — Shaghayegh Azima
(74) *Attorney, Agent, or Firm* — Scott C Harris, Esq.

(57) ABSTRACT

A drink ordering and dispensing system. A drink is ordered, and placed into a database. When drinks are poured, they are associated with the drinks that have been in the database. Scale is used to hold all the bottles. Whenever a bottle is removed or replaced on the scale, the total weight of the scale changes, and hence the weight change of the bottle can be determined. Once the drink is poured, the id of the bottle, and the weight on the scale before and after pouring is used to determine if the drink has been over poured. The scale includes a camera that can be used to identify the bottle and the server who does the pouring. The server who does the pouring can be identified using a biometric scan of the person, obtained using the same camera that identifies the bottle being poured.

17 Claims, 2 Drawing Sheets

(56) References Cited

U.S. PATENT DOCUMENTS

| | | |
|---|---|---|
| 8,954,347 B1 | 2/2015 | Einfalt |
| 10,223,683 B1* | 3/2019 | Dalia .................... G06Q 20/26 |
| 2002/0070861 A1 | 6/2002 | Teller |
| 2004/0133473 A1 | 7/2004 | Anderson |
| 2005/0000737 A1 | 1/2005 | Fox |
| 2006/0238346 A1* | 10/2006 | Teller ................. G01G 23/3735 |
| | | 340/572.1 |
| 2007/0228068 A1 | 10/2007 | Schneider |
| 2008/0082360 A1 | 4/2008 | Bailey |
| 2008/0147211 A1 | 6/2008 | Teller |
| 2008/0195251 A1 | 8/2008 | Milner |
| 2009/0261974 A1* | 10/2009 | Bailey .................. G06Q 10/087 |
| | | 340/568.1 |
| 2010/0037985 A1 | 2/2010 | Waters |
| 2011/0180563 A1 | 7/2011 | Fitchett |
| 2011/0313871 A1 | 12/2011 | Greenwood |
| 2012/0261468 A1 | 10/2012 | Hecht |
| 2014/0163725 A1 | 6/2014 | Wilinski |
| 2014/0269972 A1 | 9/2014 | Rada |
| 2014/0351068 A1 | 11/2014 | Renfroe |
| 2015/0287006 A1 | 10/2015 | Hunter |
| 2015/0375984 A1* | 12/2015 | Arcand ................. G07F 13/065 |
| | | 141/94 |
| 2016/0141322 A1 | 5/2016 | Gokingco |
| 2017/0135519 A1 | 5/2017 | Deng |
| 2017/0275147 A1 | 9/2017 | Moezidis |
| 2018/0106580 A1 | 4/2018 | Li |
| 2018/0247283 A1 | 8/2018 | Milici |
| 2018/0349848 A1 | 12/2018 | Edwards |
| 2019/0072424 A1 | 3/2019 | Clément |
| 2019/0158563 A1 | 5/2019 | O'Connell et al. |
| 2019/0197466 A1 | 6/2019 | Hand, III |
| 2019/0213607 A1 | 7/2019 | Eppley |
| 2019/0303864 A1* | 10/2019 | Edwards ............ G01G 19/4144 |
| 2020/0247661 A1 | 8/2020 | Rao |
| 2021/0125139 A1 | 4/2021 | Gregory |
| 2021/0221667 A1* | 7/2021 | Venkatakrishnan .. G07F 13/025 |
| 2021/0253415 A1 | 8/2021 | Nolan |
| 2021/0374836 A1* | 12/2021 | Bronicki ............... G06T 7/0002 |
| 2021/0403309 A1 | 12/2021 | Patel |
| 2022/0051188 A1 | 2/2022 | Stoodley |
| 2022/0230216 A1 | 7/2022 | Buibas |
| 2023/0124838 A1 | 4/2023 | Groff |
| 2023/0206290 A1 | 6/2023 | Huang |
| 2023/0325905 A1 | 10/2023 | Locke |
| 2024/0070765 A1* | 2/2024 | Yahata ............... G06Q 30/0643 |
| 2024/0241587 A1 | 7/2024 | Lv |

FOREIGN PATENT DOCUMENTS

| | | | |
|---|---|---|---|
| CN | 113989984 A | | 1/2022 |
| CN | 118044704 A | | 5/2024 |
| GB | 2369347 A | | 5/2002 |
| GB | 2503259 A | | 12/2013 |
| GB | 2512050 A | | 9/2014 |
| JP | 2018106580 A | | 7/2018 |
| JP | 20233025884 A | * | 2/2023 |
| JP | 3242453 U | * | 6/2023 |
| KR | 102187090 B1 | * | 12/2020 |
| WO | WO-2016141322 A1 | | 9/2016 |
| WO | WO-2017156619 A1 | * | 9/2017 ....... G06Q 20/40145 |
| WO | WO-2019158563 A1 | | 8/2019 |

OTHER PUBLICATIONS

U.S. Appl. No. 11/192,770, filed Dec. 7, 2021, Lev Volftsun.
U.S. Appl. No. 11/992,143, filed May 28, 2024, William Christian Carter.

* cited by examiner

BARMASTER AUTOMATED ORDER SYSTEM USING SCALE AND BIOMETRICS

BACKGROUND

Restaurant style point-of-sale systems can take or receive an order from a user in a restaurant, and maintain the bill for that order.

Many different systems of this type are known, including handheld systems that wirelessly communicate to another location.

Patent applications, including US 2009 0261974, describe a system that wirelessly monitors inventory in the dispensing of items.

SUMMARY OF THE INVENTION

The inventors recognized that there are a number of drawbacks with the current systems and have recognized ways to improve the process of inventory management beyond those described in previous patent applications.

Embodiments describe an inventory management system for drink dispensing system, including a drink measure system and a video management system, all managed via a video and inventory manager.

An embodiment describes a scale device which weighs multiple different items, and includes a camera that monitors pouring of drinks and who poured the drinks, to create inventory management information.

BRIEF DESCRIPTION OF THE DRAWINGS

In the Drawings:
the figures show aspects of the invention, and specifically.

DETAILED DESCRIPTION

The present application describes a system for monitoring the dispensing of products in a sales establishment, and verifying that charges that are entered for the items that are served by servers.

An embodiment describes monitoring the dispensing of alcoholic drinks. However, it should be understood that this system can be used to monitor different products in different environments including food, non alcoholic drinks, as well as other items that are sold and dispensed in an environment, including, as in an embodiment, a restaurant environment.

Figure 1:
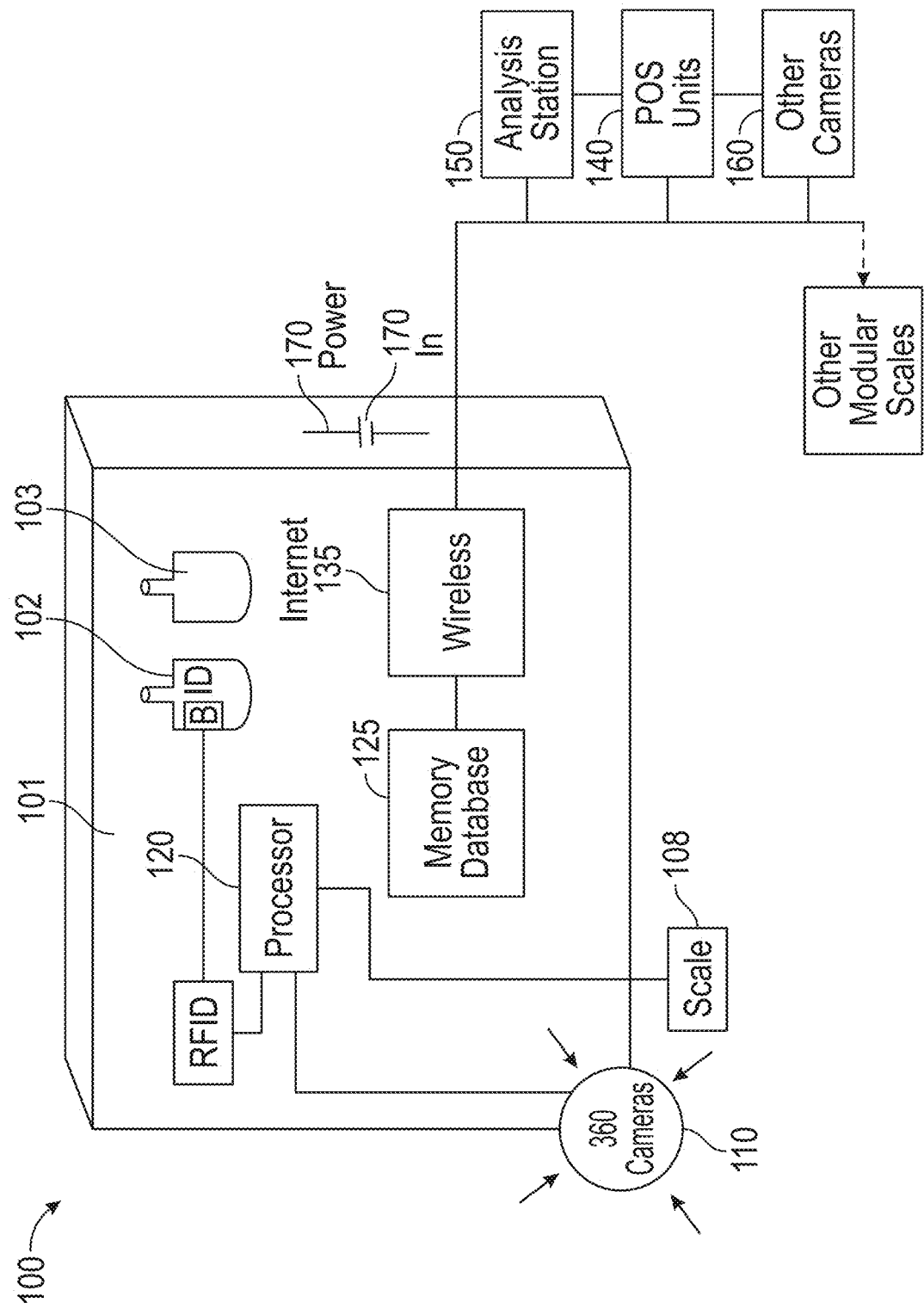
FIG. 1 shows a block diagram of a drink dispensing system.

An embodiment of the overall hardware used according to the present system is shown in FIG. 1. This provides an inventory management system using modular components that provide and store data, and coordinate the information thus received.

The block diagram of FIG. 1 shows the hardware used by the system. A scale assembly 100 is a modular device which can be added to a restaurant point of sale or bill management system. The scale assembly 100 includes a top surface 101 on which a number of bottles such as 102, 103 are stored. The scale assembly measures the weight of the bottles 102, 103, and also identifies the bottles. Multiple scales can be used in a single system. In an embodiment described herein, the scale has multiple bottles that are stored on a single surface 101.

In one embodiment, the bottles can be identified using an RFID reader 105 which reads a corresponding tag 106 on each bottle to determine the contents of each bottle.

In another embodiment, one or more cameras 110 are used to image the different bottles on the scale surface 101 and that are removed from the scale surface 101. When the bottles are removed or replaced, the images of those bottles are compared with a database of known bottle appearances. This database can include images of each bottle used by the establishment. In this way, comparison of the image of the bottle being moved (removed or replaced), to the database, can determine the contents and brand of each bottle from the bottle's appearance obtained by the camera.

Any time a bottle is lifted or replaced on the scale, it is identified in this way, in one embodiment.

The camera(s) 110 are also used to monitor the drink pouring operation, determine who (i.e, one of a number of specific servers) is doing the pouring, and maintain video evidence of certain events.

A 360° camera 110 receives images from an area of the scale assembly, and all areas around the scale assembly. In one embodiment, this can be a single 360° camera located at a corner of the assembly.

In another embodiment, this can use multiple different cameras, which can be located for example on a top surface or an edge surface of the scale assembly and facing in different directions.

All of the information obtained by all of the subsystems is sent to the processor 120, which processes and stores the information as described herein. The processing of the information creates a database stored in memory 125.

The system can also communicate using a wireless communicator 130, e.g,. over wifi, with devices that are ancillary to the modular device. In particular, this can communicate with point-of-sale units 140 in the establishment which are used to receive and coordinate obtaining the information from the devices.

The communication can also communicate with an analysis station 150 which as described herein can be used to supplementally analyze the video when problems have been identified.

This can also communicate with one or more other cameras 160, which may be located throughout the establishment to provide additional views of events that occur in the establishment.

The communicator 130 can also communicate with the Internet 135, to receive updates to the program used to operate the system, to backup the memory database to a cloud backup server, for example, and to receive updated information on different bottles to use in matching to the bottle database.

External power 170 is provided to the device, which can also charge an internal battery 171 allowing the device to operate off of battery power as needed.

The processor 120 connects via a local network connection to server terminals, e.g, server point of sale terminals.

Figure 2:
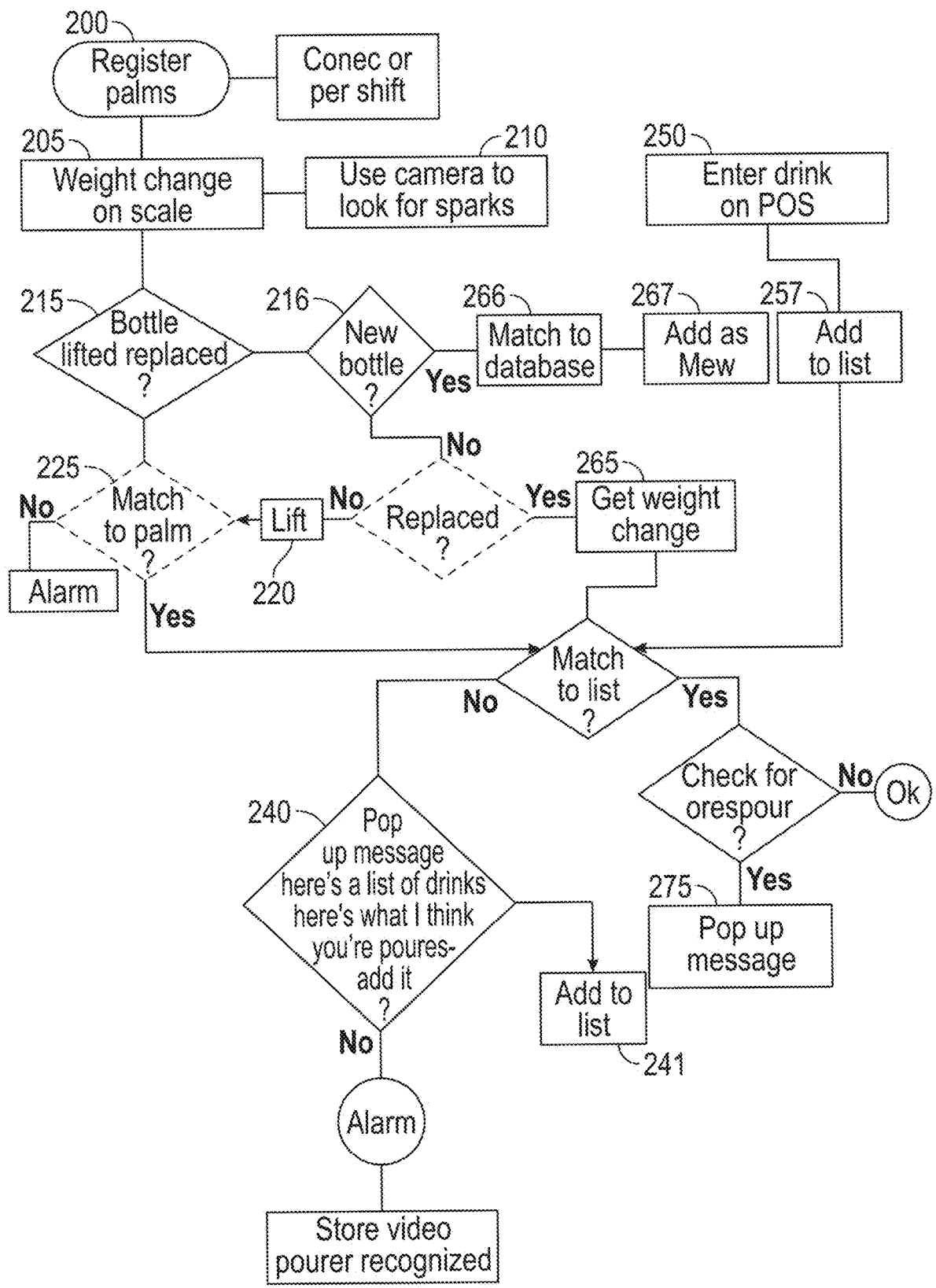
FIG. 2 shows a flowchart of operation of operating the system as a point-of-sale system to monitor drink delivery, and fulfill orders to customers and ensure that drinks are properly paid for and dispensed.

In a conventional operation mode, the processor may run and/or control according to the flowchart of FIG. 2.

In an embodiment, the system identifies specific servers who are serving drinks to customers in an embodiment. This can use any kind of biometric identification, since the camera or cameras 110 are preferably set to image the entire area around the assembly. In one embodiment, this uses a palm identification system, such as amazon one (TM). The pourer can be identified using a biometric scan of the person, obtained using the same camera that identifies the bottle being poured. Any time a bottle is moved, a biometric scan of the person moving the bottle is obtained.

This can also use an RFID bracelet system, where the servers wear an RFID readable bracelet which is read each time the weight changes.

In an embodiment, drink servers initially register their palms at 200. Thereafter, the look of the servers' palm can be used to identify the specific server who is pouring a drink.

In an embodiment, servers register once, and thereafter are recognized each time they use the system.

In another embodiment, servers register their palm and hand look at the beginning of each shift, so that the specific way that their hand/arm/palm, clothing look is up to date at the beginning of each shift.

Each time a server serves a drink, they do so by reaching over the scale assembly, and therefore reaching over the camera 110. As the hands go over the assembly, this is identified by the palm identification system, in an embodiment, or by more general biometric identification of a specific look and clothing that the user has that day, in another embodiment. While the embodiment described herein refers to palm identification, it should be understood that any of the biometric identifications that are described throughout this specification can use any kind of biometric identification, including a biometric identification that requires re-registration each day.

The user eventually touches and removes or replaces a bottle. The removal or replacement of the bottle causes a weight change on the scale at 205. In this way, the system automatically identifies not only the fact that a bottle has been removed from the scale (and later replaced on the scale) but also the specific person who did the removing or replacing.

In this embodiment, multiple different bottles are kept on the same surface 101 of scale 100. Any time a bottle is removed or replaced, the weight measured by the scale changes.

At 205, the system starts its main operation by looking for a weight change on the scale. The possible operations from a weight change or, a bottle lifted, a bottle replaced, a new bottle added, or a bottle discarded. In general, all of these actions are referred to as a bottle change.

At 215, the camera 110 is used to find which bottle has been changed. This is done by matching the look of the bottle that has been moved, as identified by the camera, to looks in the system. Each bottle will have a unique look including its color, bottle shape, and label shape and color. These looks can change from time to time, and are periodically downloaded as an update system, so that the memory 205 stores an updated list of all looks of all bottles that are authorized to be sold within the bar. This can be selected by the manager, who decides what bottles or what alcohol is being sold in the bar, and set as one of the parameter registrations done at 201.

When there is a bottle change, the camera is used to image the bottle to find which bottle was lifted or replaced at 215.

A housekeeping step can be carried out at 216, by comparing the weight of the bottle that was removed, against the empty weight of the particular bottle that was identified. For example, if an empty Vodka bottle weighs 100 g, the weight of the bottle that was removed is compared against that empty bottle weight of 100 g. If the amount in the bottle removed is within one to two drinks of being empty, this will cause the bottle to be marked as a discard bottle at 216. This means that after the drink from this bottle is poured, the bottle will thereafter be discarded, thus not requiring a replace event for that specific bottle.

Otherwise, a bottle is lifted from the scale causes a weight reduction that defines a lift event at 220. This records the weight of the bottle lifted and the identity of the bottle lifted.

The system then matches to the user's palm at 225 to find the server who is pouring. If no palm match is obtained, then an audible alarm can be sounded at 230, requiring the pourer to go back and scan their palm over the camera to silence the beep and allow the system to identify the pourer.

After the palm is matched, the system finds a drink match at 235. In this embodiment, drinks are entered on the point-of-sale system, shown at 250. The drink is then added to the list at 251. The drink as poured is matched to the list at 235. If there is a match between the drink on the list, and the lift event at 220, then control starts a timer at 236 for the replace event. The bottle thus removed must be replaced within the user set amount of time such as 120 seconds, or an alarm will be sounded. Note that if the housekeeping at 216 has identified the bottle as a soon to be discarded bottle, the timer is not started.

If the drink is not matched, then at 240, the system pops up a message to a computer terminal associated with the identified server saying here's a list of drinks from the point-of-sale that are unaccounted for, and here's what I think you are pouring. The server can automatically add at 241 the drink to the appropriate customer's tab.

An alarm can be set if the pour does not properly match to an existing or added drink.

The weight change is used to determine how much alcohol has been on the bottle by pouring a drink. For example, 1 ounce of alcohol may way 1 ounce, and therefore a reduction in weight by 1 ounce indicates that the system that is single shot of alcohol has been poured.

When the weight changes at 215, and the weight is increased, this forms a replace event at 260, where a recognized bottle is being replaced on the scale. At 260, a replace event is established. The weight difference between the weight when the bottle was removed for the lift event, and the weight when the bottle is returned for the replace event, is determined at 265. This is matched to the identified drink match at 241. If the amount of alcohol that was poured causes a weight change in the bottle that is greater than the amount for the drink that was ordered, then the system stores video and information to be reviewed later, as part of an overpour alarm sequence. Different actions for an overpour event can also be carried out, for example at 275.

When the weight changes at 215, and an unrecognized bottle is placed on the scale, this is set as a new bottle at 266, and added as a new bottle along with its weight at 267. This new bottle can subsequently be used for additional drink pouring.

If there is no weight change on the scale, then maintenance operations are carried out at 210 where the camera output is investigated to look for an abnormal lighting situation, which could identify, for example, a fire. Other items which can be monitored from the camera can also be investigated at 210.

The system as described herein can operate with any kind of existing or new point of sale system for ordering items such as drinks in a bar, maintaining the invoices for the individual patrons based on their orders, and generating those invoices. Existing systems of this time are sold by companies such as Toast™

It's also contemplated that a version of the front end system or the backend system can be stored on the processor 120, with the memory 125 forming the database that stores the information obtained by the processor. By doing so, this provides the ability for a standalone system to be quickly put into service and interfaced with cellular telephones or any other handheld computer that is capable of running an app and has communication capability.

In this embodiment, any time an exception or alarm is declared, video footage from the cameras in the area of the exception are associated with the exception. All of the video footage from every camera that was facing the inventory receiving is saved, and associated with this exception. This allows a supervisor or other person reviewing the exception later after it has occurred, to receive the video as part of the exception, to determine how the exception was caused. Exceptions as described herein can be caused by lift events that are not associated with orders, orders that do not get subsequent lift events and subsequent weight reductions, excessive weight reductions for the order that was placed, or the wrong material being poured for the order that was placed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A drink monitoring system, comprising:
a drink order maintaining system that stores a list of drinks ordered by customers;
a scale, having a weighing surface holding at least one liquid containing vessel and creating a weight output indicative of a current weight on the weighing surface;
a camera, imaging the weighing surface to create an image output;
a memory, storing a database, including at least a plurality of images of a plurality of different liquid containing vessels;
a computer which analyzes the image output to determine a first liquid containing vessel which has been interacted with by a user,
and compares the first liquid containing vessel to the images of different liquid containing vessels in the database, to find a specific type of said first liquid containing vessel, that was interacted with by the user;
and the computer also storing weights of multiple different liquid containing vessels, and using said weights to determine a change in weight of the first liquid containing vessel between a first time when the first liquid containing vessel is removed from the weighing surface and a second time when the first liquid containing vessel is returned to the weighing surface;
and matches an amount of the change of weight to an amount of change of weight expected from the matching order;
and declares a mismatch alarm if the change of weight does not match to the matching order,
where the camera is also used to obtain a biometric scan of a person lifting or replacing a vessel; and
wherein the biometric scan is a scan of a hand of the person, as the hand comes over an area of the scale to lift or replace the vessel.

2. The system as in claim 1, wherein the computer compares a specific liquid in the specific liquid containing vessel with the list of drinks in the order to find the matching order.

3. The system as in claim 2, wherein the computer compares said change in weight to an expected amount of weight change from the matching order.

4. The system as in claim 1, wherein the computer includes a database including images representing looks of a plurality of different liquid containing vessels, and where the computer compares a specific liquid containing vessel that has been lifted to the images of the different liquid containing vessels in the database to find a match and to identify the specific liquid containing vessel, and where the computer receives updates to the database to add additional looks of additional liquid containing vessels to the database and thereafter matches to the additional looks of the additional liquid containing vessels.

5. The system as in claim 1, wherein the computer detects a vessel lift by detecting a reduction in total weight on the surface of the scale,
where the computer determines the specific first liquid containing vessel that was lifted, using the output of the camera, to determine a vessel lift,
where the computer detects a vessel replace by detecting an increase in total weight on the surface of the scale, and determines the specific first liquid containing vessel being replaced, using the output of the camera, and
where the computer determines said change in weight between the vessel lift and the vessel replace, by subtracting the weight of the vessel that was replaced from the weight of the vessel that was lifted.

6. The system as in claim 1, wherein the computer detects a vessel lift by detecting a reduction in total weight on the surface of the scale,
where determines the specific first liquid containing vessel that was lifted, using the output of the camera, and
wherein the system determines if a weight of a lifted vessel is close enough to empty that the vessel will need to be discarded, and suppresses further of said mismatch alarms for that lifted vessel until replaced.

7. The system as in claim 1, wherein the computer detects a new vessel on the scale, and makes a new weight for the new vessel and adds the new weight to the database as the new weight for the new vessel.

8. The system as in claim 1, wherein the computer detects a new vessel being put on the weighing surface in response to detecting a weight increase on the weighing surface along with detecting a new vessel from the image output and also detecting an increase in weight that is at a full weight of the vessel in additional to detecting the new vessel being detected from the image output.

9. The system as in claim 2, wherein the computer detects a vessel lift by detecting a reduction in total weight on the surface of the scale,
the computer determines the specific first liquid containing vessel that was lifted, using the output of the camera,
the computer detects a vessel replace by detecting an increase in total weight on the surface of the scale, and determines the specific first liquid containing vessel being replaced, using the output of the camera, and
the computer determines said change in weight between the vessel lift and the vessel replace, by subtracting the weight of the vessel that was replaced from the weight of the vessel that was lifted, and comparing the change in weight to an expected change in weight from the matched order.

10. A drink ordering system, comprising:

A point of sale system that stores a list of drinks ordered by servers, a scale, having a weighing surface holding at least one liquid containing vessel and creating a weight output indicative of a current weight on the weighing surface;

a camera, imaging the weighing surface to create an image output;

a memory, storing a database, including at least a plurality of images of a plurality of different liquid containing vessels;

a computer which determines a change in weight on the scale to determine a vessel remove event or a vessel replace event and analyzes the image output to find a biometric characteristic of a user who caused the event, the computer compares a specific liquid in the vessel with the list of drinks in the order, to find a matching order in the point of sale system;

and adds an indication of the user who caused the event to the point of sale system, where the camera is also used to obtain a biometric scan of a hand of the user, as the hand comes over an area of the scale to cause said vessel remove event or said vessel replace event.

11. The system as in claim 10, where the computer also storing weights of multiple different liquid containing vessels, and using said weights to determine a change in weight of the liquid containing vessel and declares an alarm when the change in weight differs from the order.

12. The system as in claim 10, wherein the computer includes a database including images representing looks of a plurality of different liquid containing vessels, where the computer compares the specific liquid containing vessel to the images of the different liquid containing vessels in the database, and where the computer receives updates to the database to add additional looks of additional liquid containing vessels to the database and thereafter matches to the additional looks of the additional liquid containing vessels.

13. The system as in claim 10, wherein the computer detects a vessel lift by detecting a reduction in total weight on the surface of the scale, where the computer determines a first liquid containing vessel that was lifted, using the output of the camera, where the computer the computer detects a vessel replace by detecting an increase in total weight on the surface of the scale, and determines a specific first liquid containing vessel being replaced, using the output of the camera, and where the computer determines said change in weight between the vessel lift and the vessel replace, by subtracting the weight of the vessel that was replaced from the weight of the specific vessel that was lifted.

14. The system as in claim 10, wherein the computer detects a vessel lift by detecting a reduction in total weight on the surface of the scale, where the computer determines a specific first liquid containing vessel that was lifted, using the output of the camera, and wherein the system determines if a weight of a lifted vessel is close enough to empty that the vessel will need to be discarded, and suppresses any further of said events for that lifted vessel until replaced.

15. A drink ordering system, comprising:

a point of sale system that stores a list of drinks ordered by servers, a scale, having a weighing surface holding multiple liquid containing vessels and creating a weight output indicative of a current weight on the weighing surface;

a computer which determines a change in weight on the scale to determine a vessel remove event or a vessel replace event and finds a matching order in the point of sale system;

determines if an amount of the change of weight matches to the amount of change of weight expected from the matching order;

and declares a mismatch alarm if the change of weight does not match, a camera, imaging the weighing surface to create an image output; and this a memory, storing a database, including at least a plurality of images of a plurality of different liquid containing vessels;

and where the computer analyzes the image output to determine a first liquid containing vessel which caused the vessel remove event or a vessel replace event, wherein the computer analyzes the image output to find a biometric characteristic of a user who caused the vessel remove event or the vessel replace event, and wherein the camera is also used to obtain a biometric scan of a hand of the user, as the hand comes over an area of the scale to cause the vessel remove event or the vessel replace event.

16. The system as in claim 15, wherein the computer detects the vessel remove event by detecting a reduction in total weight on the surface of the scale, and determines a specific first liquid containing vessel that was lifted to cause the vessel remove event, using the output of the camera, and the computer detects the vessel replace event by detecting an increase in total weight on the surface of the scale, and determines the specific first liquid containing vessel being replaced, using the output of the camera, and the computer determines said change in weight between the vessel remove event and the vessel replace event, by subtracting the weight of the vessel at the vessel remove event from the weight of the vessel at the vessel replace event.

17. The system as in claim 15, wherein the computer detects the vessel remove event by detecting a reduction in total weight on the surface of the scale, and determines a specific liquid containing vessel that was lifted, using the output of the camera, and wherein the system determines if a weight of a lifted vessel is close enough to empty that the vessel will need to be discarded, and suppresses any further alarms for that lifted vessel until replaced.

* * * * *